March 20, 1945. A. B. WHITE ET AL 2,372,147
RESISTANCE WELDING
Filed March 21, 1942 4 Sheets-Sheet 4
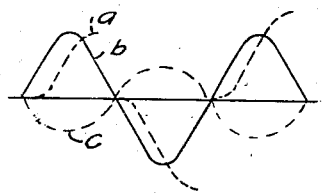
Fig. 4.
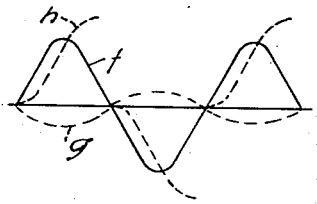
Fig. 6.
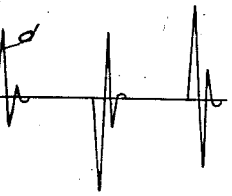
Fig. 5.
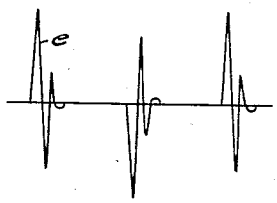
Fig. 7.
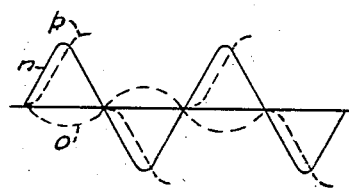
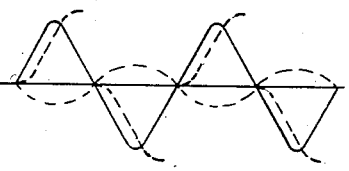
Fig. 8.
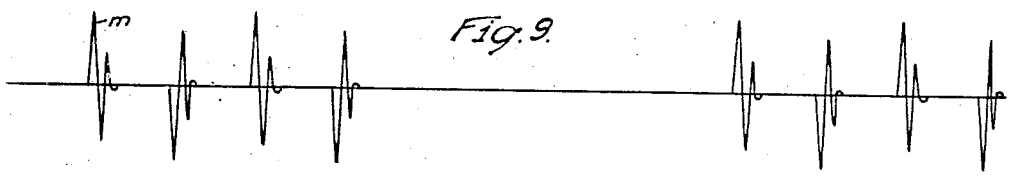
Fig. 9.
Fig. 10.
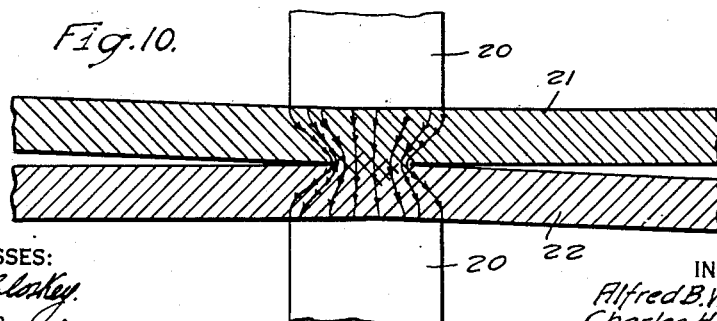
WITNESSES:
E. A. McCloskey.
F. V. Giolma
INVENTORS
Alfred B. White and
Charles H. Jennings.
BY
Crawford
ATTORNEY Patented Mar. 20, 1945

2,372,147

UNITED STATES PATENT OFFICE 2,372,147

RESISTANCE WELDING

Alfred B. White and Charles H. Jennings, Forest Hills, Pa., assignors to Westinghouse Electric & Manufacturing Company, East Pittsburgh, Pa., a corporation of Pennsylvania Application March 21, 1942, Serial No. 435,607

2 Claims. (Cl. 219—10)

Our invention relates, generally, to welding and it has reference, in particular, to methods of interrupted resistance welding.

Generally stated, it is an object of our invention to provide a new and novel method of resistance welding using repeated impulses of current having relatively high frequency characteristics.

More specifically, it is an object of our invention to provide for charging a condenser from a relatively low frequency source and discharging the condenser into a welding circuit having a relatively high natural frequency so as to produce a plurality of interrupted current impulses having relatively steep wave fronts for effecting fusion of the members to be welded at each weld point.

A further object of our invention is to provide for resistance welding metallic members by using periodic relatively high frequency current impulses.

Another object of the invention is to utilize the skin effect of relatively steep wave front current impulses to distribute the flow of weld current about the periphery of the weld point.

It is also an important object of our invention to provide for applying successive impulses of welding current at spaced intervals of time to a weld point and utilizing current impulses having sufficiently steep wave fronts that the skin effect provides a ringlike weld in which the zone of fusion is substantially adjacent the outer edge thereof.

We also propose to provide for effecting successive high frequency discharges at spaced intervals of time through members to be welded by initiating said discharges at substantially corresponding points in different half cycles of the voltage wave of a relatively low frequency source and making the duration of such discharges less than a half cycle of the said wave.

It is also an object of our invention to provide for passing periodic relatively high frequency current impulses through members to be welded in synchronism with the voltage wave of a relatively low frequency source.

In practicing our invention greatly improved welds may be made between metals which are usually difficult to weld, such as, for example, copper and aluminum by using successive periodic impulses of welding current at each weld point which impulses have relatively high frequency characteristics—relatively steep wave fronts. One method of producing such impulses is by charging a condenser from a suitable source during certain periods at spaced intervals of time and discharging it following each charging period into the primary circuit of a welding transformer which, in connection with the condenser, has a relatively high natural frequency, so that relatively high frequency current impulses of weld current may be produced in the welding circuit having a duration considerably less than the charging periods, whereby they occur at spaced intervals of time. Because of the skin effect of these relatively steep wave front impulses, which causes successive impulses of such nature to crowd to the periphery of the conducting path between the members to be welded, a different current distribution is produced in the weld zone. Welds may be thus produced between the members which have a much higher strength adjacent the periphery thereof, than welds produced in the conventional manner using impulses of a relatively low frequency.

For a more complete understanding of the nature and scope of our invention reference may be had to the following detailed description which may be read in conjunction with the accompanying drawings in which:

Figs. 4 and 5 illustrate voltage and current curves typical of the system shown in Fig. 1;

Figs. 6 and 7 illustrate voltage and current curves typical of the system shown in Fig. 2;

Figs. 8 and 9 illustrate voltage and current curves typical of the welding system of Fig. 3; and Fig. 10 is a cross-sectional view of members being welded in accordance with the invention illustrating the current paths through the members.

Figure 1:
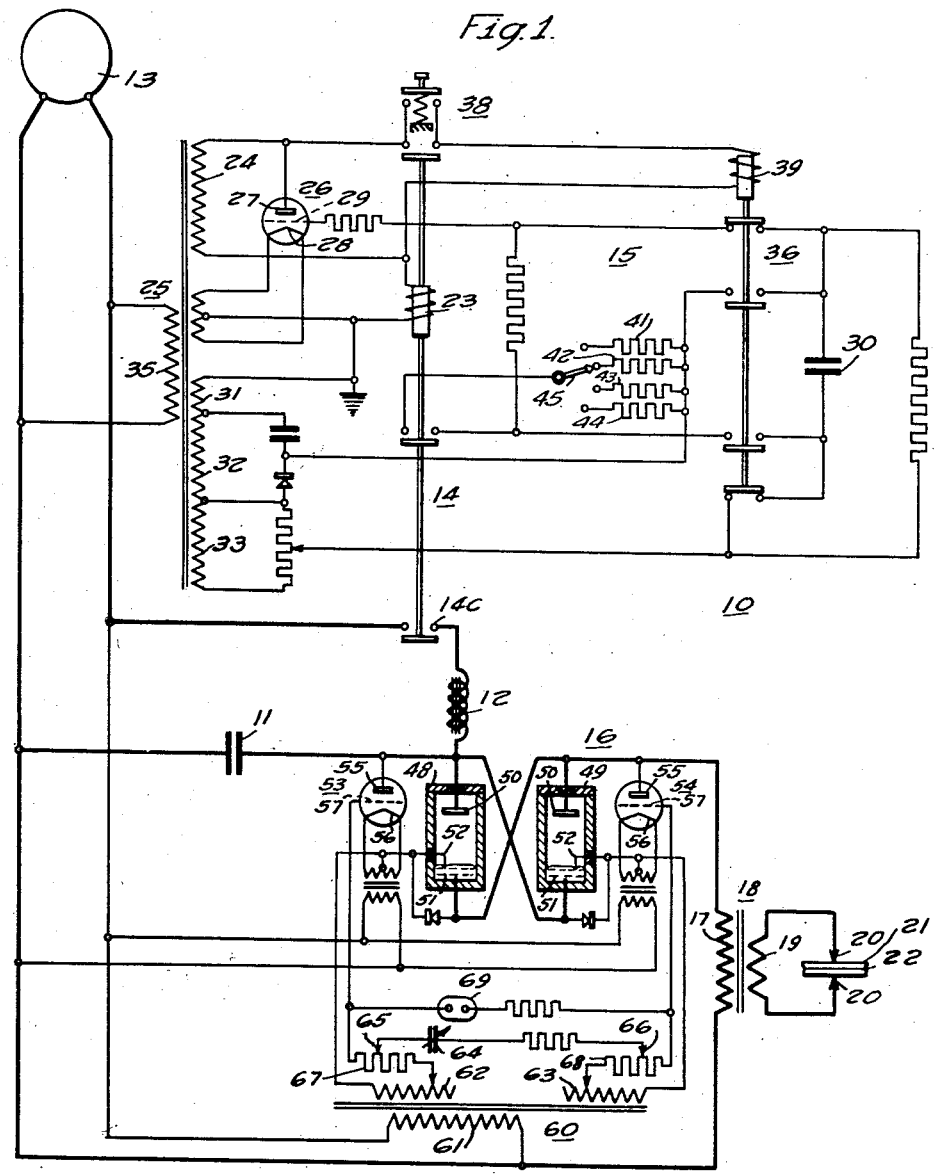
Figure 1 is a diagrammatic view of a resistance welding system for practicing our invention.

Referring to Fig. 1, the reference numeral 10 denotes, generally, a non-synchronous resistance welding system which may be used to practice the method of our invention. In this system a condenser 11 and a suitable current controlling impedance 12 are disposed to be connected to a source of alternating current 13 by switch means 14, which may be either manually operated or operated under the control of timing means indicated generally by the numeral 15, as shown. The impedance 12 may comprise an iron core reactance as shown or an air core reactance may be used instead, when the condenser 11 has a relatively large capacity. Switching means 16 is provided for connecting the primary winding 17 of a welding transformer 18 across the condenser 11. The secondary winding 19 of the welding transformer may be connected to welding electrodes 20 which engage the members 21 and 22 which are to be welded.

The timing circuit 15 may be of any suitable type comprising, for example, a condenser discharge timing circuit such as is described in detail in Patent No. 2,008,413, issued to John W. Dawson on July 16, 1935. The operation of the control switch 14 which connects the condenser 11 to the source 13 for charging may be controlled by controlling the energization of the operating winding 23 thereof from a secondary section 24 of a control transformer 25 by means of a gaseous discharge valve 26 having a cathode 27, an anode 28 and a control grid 29. A timing condenser 30 may be provided, which may be normally connected in series circuit relation with the control grid 29 and the cathode 27 across sections 31, 32 and 33 of the secondary winding of the control transformer 25, the primary winding 35 of which may be connected to the source 13.

In order to provide for controlling the conductivity of the valve 26, a control switch 36 may be provided for reversing the connections of the condenser 30 to the control grid 29 and cathode 28 to render the valve conductive. In order to initiate an operation a push button switch 38 may be provided for connecting the operating winding 39 of the control switch 36 to the section 24 of the control transformer secondary winding. A plurality of discharge resistors 41, 42, 43 and 44 of different values and an associated contact arm 45 may be provided for completing a discharge circuit for the timing condenser 30 so as to effect timed discharges thereof and thus render the control valve 26 conductive for predetermined intervals of time.

The switching means 16 may be of any suitable type, comprising, for example, a switching system such as is described in detail in the copending application of Joseph Slepian and Alfred B. White, Serial No. 399,084, filed June 21, 1941. For example, the switching means 16 may comprise a pair of inversely connected arc discharge devices 48 and 49 having anodes 50, mercury pool cathodes 51 and control electrodes 52. Control valves 53 and 54 having anodes 55, cathodes 56 and control grids 57 may be connected between the anodes and control electrodes of the arc discharge devices 48 and 49, respectively, for controlling the conductivity of said devices.

In order to control the conductivity of the gaseous discharge valves 53 and 54, means may be provided for applying to the control grids 57 thereof suitable control voltages. For example, a control transformer 60 may be provided, having a primary winding 61 connected to the source 13 and secondary windings 62 and 63 which may be connected between the control grids 57 and the cathodes 56 of the control valves 53 and 54 so as to apply to the control grids alternating current bias voltages which are negative with respect to the anode-cathode voltages of the control valves, and which render the control valves non-conductors until predetermined points in the source voltage wave.

In order to provide for rendering the arc discharge devices 48 and 49 conductive in response to the relatively high frequency currents produced in the welding circuit when the condenser 11 is connected thereto, means such as the control condenser 64 may be provided. The condenser 64 may, for example, be connected by movable contact members 65 and 66 to the grid resistors 67 and 68 which may be connected in the grid circuits of the valves 53 and 54, respectively. A gap device 69 may be connected between the control grids of the valves 53 and 54 to protect the valves against over voltage by providing a relatively low resistance breakdown path in case of too high a voltage in the grid circuit.

When the push button 38 is closed, the control relay 36 operates to connect the timing condenser 30 between the control grid 29 and the cathode 27 of the control valve 26, so as to apply a positive bias voltage to the control grid 29 and render the control valve conductive. The operating winding 23 of the control switch is thereby energized, causing closure of the main contacts 14c, and connecting the condenser 11 to the source 13.

Referring to Figs. 4 and 5 as well as Fig. 1, it will be seen that when the switch 14 closes the condenser is connected to the source 13 and commences to charge. When the voltage of the condenser 11—indicated by the dotted curve $a$—reaches a given value in a half cycle of the source voltage wave-indicated by the curve $b$, and the negative bias voltage-indicated by the dot and dash curve $c$ on the control grids 57 reaches a sufficiently low negative value, one or another of the control valves 53 or 54 will be rendered conductive, depending on the polarity of the particular half cycle. Its associated arc discharge device is thereby rendered conductive, connecting the primary winding 17 of the welding transformer 18 across the condenser 11. As the natural frequency of the condenser 11 and the primary winding is relatively high, the wave front of the current impulses through the primary winding will be relatively steep, as shown by the curves $d$ of Fig. 5. While these impulses are shown as oscillatory, it will be understood that they may also be limited to single unidirectional discharges, either by critically damping the discharge circuit, or providing a unidirectional bypass therefor to absorb reverse oscillations, if desired.

In the circuit shown the condenser 64 connected between the grid circuits of the control valves 53 and 54 provides a relatively low resistance path to current impulses having relatively steep wave fronts, so that the other of the control valves is rendered conductive in response to the reverse voltage produced across the condenser 11 by the initial discharge through the primary winding of the welding transformer. The other of the arc discharge devices is thereby rendered conductive during the same initial half cycle of the relatively low frequency source 13, permitting the condenser 11 to discharge in the opposite direction through the primary winding 17. This sequence may be continued several times during an interval of less duration than one-half cycle of the source voltage wave, thus producing a surge of welding current having a relatively high peak value and comprising one or more relatively steep front waves which surge or impulse lasts during an interval which is less than one half cycle of the source voltage wave.

As soon as the voltage of the condenser 11 reaches a predetermined minimum value, the arc discharge devices 48 and 49 are rendered non-conductive. When the voltage of the condenser 11 reaches a predetermined value of the opposite polarity on the next succeeding half-cycle of the source voltage wave, the arc discharge devices 48 and 49 are again rendered conductive to effect the flow of subsequent relatively high frequency current impulses through the members to be welded. Successive impulses will be produced so long as the switch 14 is closed, which in this instance is determined by the timing means 15.

Since these relatively high frequency impulses are not initiated until substantially corresponding predetermined points in different half cycles of the voltage wave of the source 13, preferably near to the zero value thereof, and each is of shorter duration than one half cycle of the source voltage wave, so that it terminates before the next succeeding one, intervals of time occur between successive impulse surges of welding current, and interrupted pulsations of welding current are produced which may be utilized in welding according to our invention. The surfaces of the members being welded are thus provided with cooling periods between successive impulses or surges of weld current. Due to the high frequency characteristics of these impulses, the flow of current tends to concentrate about the periphery of the weld zone rather than concentrating near the center thereof, as in the usual type of weld. Accordingly, welds made in accordance with our invention by using a relatively high frequency current impulse or current impulses having relatively steep wave fronts, have a relatively high peripheral strength. The welds produced are substantially ringlike in form, and members thus welded are more difficult to separate after thus welding.

Figure 2:
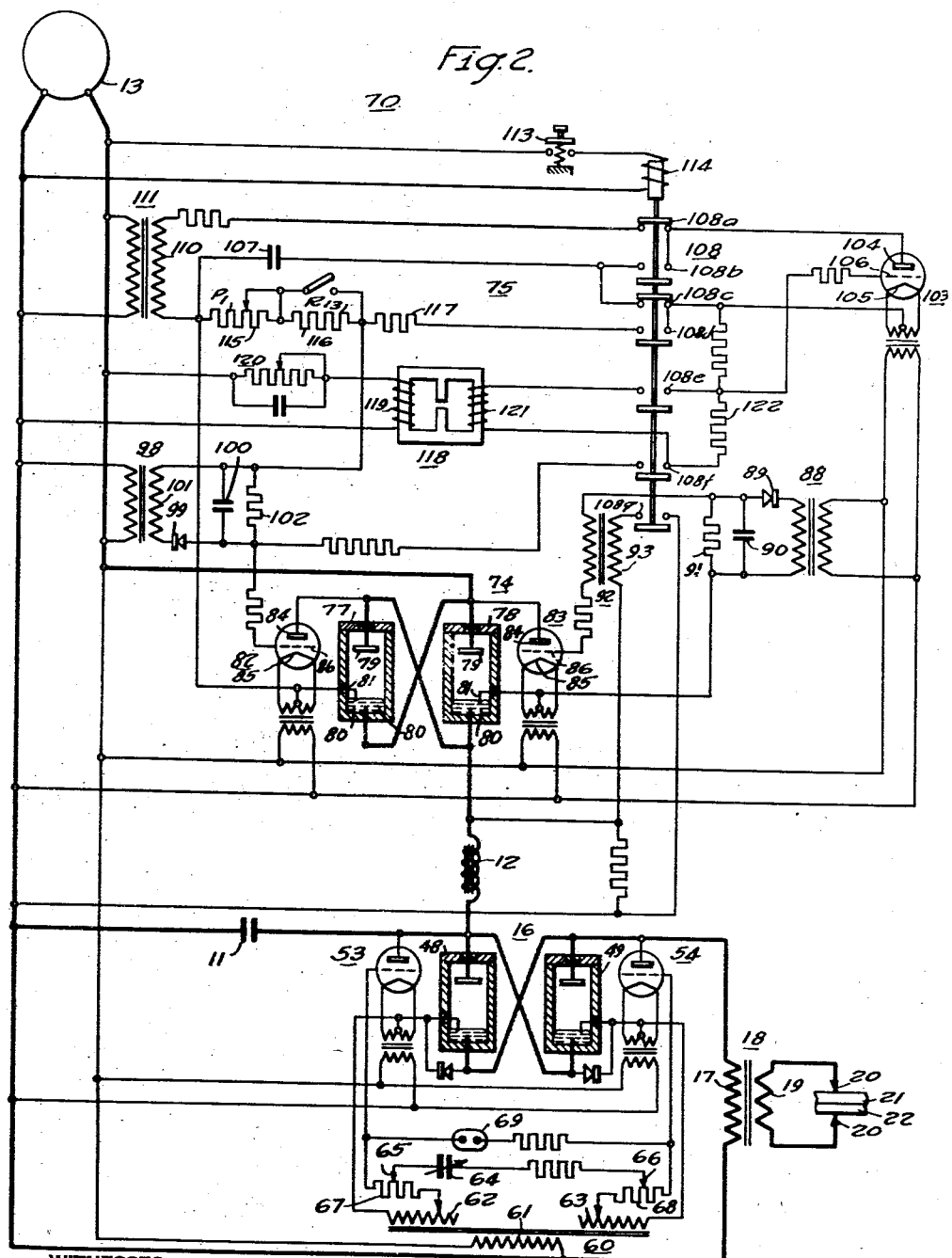
Fig. 2 is a diagrammatic view of a synchronous interrupted spot welding system whereby the invention may be practiced.

Referring to Fig. 2, the reference numeral 70 denotes, generally, a synchronous resistance welding system whereby the improved method of welding may be practiced. As shown in this figure, the condenser 11 and the impedance 12 may be connected to the alternating-current source 13 in synchronism therewith by switching means 74 under the control of timing means indicated generally by the numeral 75. The primary winding 17 of a welding transformer 18 may be connected to the condenser 11 under predetermined voltage conditions thereof in a manner similar to that described in connection with Fig. 1 by similar switching means indicated generally by the numeral 16.

The switching means 74 may, for example, comprise arc discharge devices 77 and 78 connected inversely in series circuit relation with the condenser 11, impedance 12 and source 13. The arc discharge devices 77 and 78 may be of the usual type, having anodes 79, cathodes 80 and control electrodes 81. Control valves 82 and 83 having anodes 84, cathodes 85 and control grids 86 may be connected between the anodes and control electrodes of the arc discharge devices 77 and 78 for controlling the conductivity thereof.

In order to render the control valve 83 normally non-conductive, suitable means may be provided for applying a negative bias thereof, such as the control transformer 88 which may be connected to the source 13, and provided with a rectifier 89 and a condenser 90 for producing a negative bias voltage across a control resistor 91 in the grid circuit of the control valve 83 to provide a suitable negative bias voltage on the control grid 86 thereof. Means such as the grid transformer 92 having the primary winding 93 thereof connected across the condenser 11 and impedance 12, may be provided for producing positive bias voltage for rendering the control valve 83 conductive in timed relation to the flow of current through the inductance 12.

Means may be provided for normally rendering the control valve 82 non-conductive, such as the grid transformer 98 which may be connected to the source 13 and may be provided with a rectifier device 99 and condenser 100 connected across the secondary winding 101 thereof for producing a negative bias voltage across the control resistor 102 in the circuit of the control grid 86 of the control valve 82 to normally render said control valve non-conductive.

In order to render the control valve 82 conductive in predetermined relation to the voltage wave of the source 13 and for predetermined time intervals thereof, the voltage applied to the control grid 86 of the control valve 82 may be controlled by means such as the timing valve 103 having an anode 104, cathode 105 and a control grid 106 under the control of a timing condenser 107 and a sequence control relay 108. The control relay 108 may be provided with normally closed contact members 108a and 108c for normally connecting the timing condenser 107 to the secondary winding 110 of a control transformer 111 through the timing valve 103 for charging.

Means such as the control switch 113, may be provided for connecting the operating winding 114 of the control relay 108 to the source 13 to effect operation of the relay. Contact members 108g, f and d may be arranged to close first, connecting the grid transformer 93 across the impedance 12, and connecting the control resistor 102 between the control grid and cathode of the timing valve 103 so as to apply a negative bias to the control electrode thereof rendering the valve non-conductive. Contact members 108b close subsequently connecting the timing condenser 107 in series circuit relation with the timing valve 103, discharge resistors 115 and 116, and a bias discharge resistor 117 which is connected in the grid circuit of the control valve 82 through the contact members 108d.

In order to provide for rendering the timing valve conductive at a predetermined point in the voltage wave of the source 13, means such as the impulse transformer 118 may be provided, having a primary winding 119 connected to the source 13 through a phase shifting circuit 120, and a secondary winding 121 connected across a control resistor 122 in the grid circuit of the timing valve 103. When the timing condenser 107 is connected in series circuit relation with the timing valve 103, the negative bias across the control resistor 102 is sufficient to retain the timing valve non-conductive. After the closure of contact members 108e which close last, a relatively sharp voltage impulse is produced across the control resistor 102 in the grid circuit by the impulse transformer 118 rendering the timing valve conductive. The duration of the period of conductivity is controlled by the rate of discharge of the condenser 107 through the control resistors 115 and 116.

During the interval in which the condenser 107 discharges through the timing valve 103 and the control resistors 115 and 116, a positive bias is applied to the control grid 86 of the control valve 82 through the control resistors 115 and 116, sufficient to overcome the negative bias from the control resistor 102 to render the valve 82 conductive. The arc discharge device 77 is thus rendered conductive whenever the voltage applied to the anode is positive and the condenser 11 is thereby connected to the source 13 during positive half cycles of the source 13. The control valve 23 is subsequently rendered conductive during the succeeding negative half cycles by the voltage impulses applied to the control grid 86 thereof through the grid transformer 92. The condenser 11 is thus connected to the source 13 for a timed interval as determined by the discharge time of the timing condenser 107 in synchronism with the voltage wave of the source as determined by the impulses produced by the impulse transformer 113. The connection of the welding transformer 118 to the condenser 11 for effecting the passage of periodic relatively high frequency weld current impulses through the members to be welded in timed relation to the source frequency is effected in the manner described in connection with the welding system of Fig. 1, during the period determined by the discharge time of the condenser 107.

Referring to Figs. 6 and 7 of the drawings, it will be seen that a plurality of periodic weld current impulses indicated by the curves e may be produced by the discharges of the condenser 107. These impulses are in timed relation to the voltage wave f of the source 13 and occur whenever the negative bias voltage g applied to the control grids 57 reaches a predetermined minimum value relative to the condenser voltage wave h. As the impulses are of relatively high frequency, several oscillations may occur during an interval which is less than a single half cycle of the source frequency. These impulses may have relatively high peak values and are of relatively short duration in comparison with a half cycle of the source frequency. Intervals thus occur between the high frequency discharges of successive half cycles of the source frequency, independently of any timing means and interrupted weld current impulses are produced which tend to concentrate about the periphery of the weld zone, producing a weld of high peripheral strength.

Figure 3:
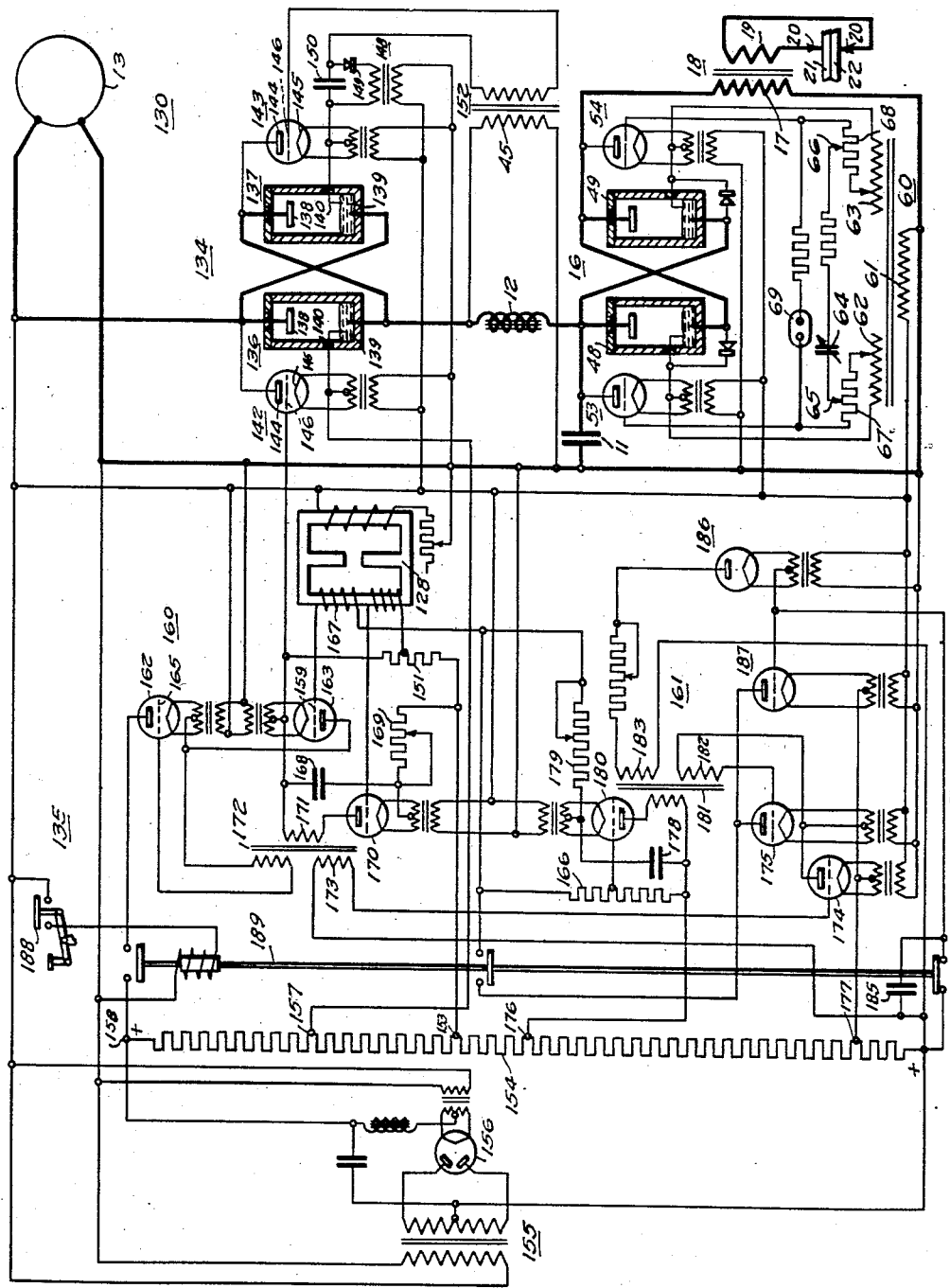
Fig. 3 is a diagrammatic view of a synchronous pulsation spot welding system whereby the invention may be practiced.

Referring to Fig. 3, the reference numeral 130 denotes, generally, a pulsation resistance welding system for producing repeated periodic impulses of relatively high frequency welding current for welding in accordance with our invention. In this system, the primary winding 17 of the welding transformer 18 may be connected to the condenser 11 by switching means 16 in the same manner shown and described in connection with the system of Fig. 1. The reference numeral 134 may denote generally switching means for controlling the connection of the condenser 11 to the source 13 under the control of timing means indicated generally by the numeral 135 for repeated timed intervals at predetermined spaced intervals of time in synchronism with the source 13.

The switching means 134 may comprise generally arc discharge devices 136 and 137 having anodes 138, cathode 139 and control electrodes 140. The discharge devices 136 and 137 may be connected inversely in a manner well known in the art and connected in series circuit relation with the condenser 11, impedance 12 and the source 13. Gaseous discharge valves 142 and 143 having anodes 144, cathodes 145 and control grids 146 may be provided for controlling the conductivity of the discharge valves 136 and 137 in the usual manner, being, for example, connected between the anodes and control electrodes thereof.

A control transformer 148 having a rectifier device 149 and a condenser 150 connected thereacross may be provided for applying a negative bias voltage to the control electrode 146 of the control valve 143 for normally rendering the control valve 143 non-conductive. Suitable means may be provided for rendering the control valve 143 conductive in predetermined timed relation to the current wave of the source 13, such as, for example, the grid transformer 152, connected across the charging circuit of the condenser 11. Thus when the condenser is charged during a half cycle the impulse produced by the grid transformer 152 renders the control valve 143 conductive in predetermined time relation to the succeeding half cycle of the source current wave.

The timing means 135 for controlling the conductivity of the control valve 142 may be generally similar to that described in detail in the copending application Serial No. 271,951, of Finn H. Gulliksen, filed May 5, 1939 and now Patent No. 2,303,453, dated December 1, 1942. For example, the control grid 146 of the control valve 142 may be connected through an "on" timing resistor 151 to an intermediate tap 153 of a voltage divider 154 which may be energized from the source 13 through a transformer 155 and a rectifying device 156. The cathode 145 of the control valve 142 may be connected to a more positive intermediate tap 157 of the voltage divider 154 so as to normally render the control valve 142 non-conductive.

In order to render the control valve 142 conductive for predetermined intervals of time, suitable "on" timing means indicated generally by the numeral 160 may be provided. Suitable "off" timing means indicated generally by the numeral 161 may be provided for periodically rendering the "on" timing means ineffective. The "on" timing means may, for example, comprise a pair of discharge devices 162 and 163 connected in series circuit relation with the "on" timing resistor 151 between the positive terminal 158 of the voltage divider 154 and the intermediate tap 153. The discharge device 162 may be of the high vacuum type which is normally conductive and may be rendered non-conductive by applying a negative impulse to the control electrode 165 thereof. The discharge device 163 may be of the arc-like type which may be normally maintained non-conductive by means of a negative bias voltage applied to the control electrode 159 thereof from the voltage divider 154 and the "off" timing control resistor 166, and may be rendered conductive by means of a control impulse applied thereto from the secondary winding 167 of an impulse transformer 128 energized from the source 13. An "on" timing condenser 168 may be connected across the "on" timing resistor 151 and provided with a control resistor 169. A control valve 170 may be connected across the condenser 168 in series circuit relation with the primary winding 171 of a control transformer 172 having a secondary winding connected between the cathode and control grid 165 of the discharge device 162, for rendering said discharge device non-conductive when the condenser reaches a predetermined voltage at which it is discharged through the control valve 170. An additional secondary winding 173 may be provided for applying a control impulse to a control valve 174 of the arc-like type which may be connected in series circuit relation with a second control valve 175 of the high vacuum type in the "off" timing circuit for connecting the "off" timing resistor 166 across a portion of the voltage divider 154 between the intermediate taps 176 and 177. An "off" timing condenser 178 is connected across the resistor 166 in series with a control resistor 179 for controlling the charging rate. A control valve 180 may be provided in parallel relation with the "off" timing condenser 178 for effecting the discharge thereof after a predetermined time, through the primary winding of a control transformer 181 to produce a negative bias impulse in the secondary winding 182 to render the high vacuum control valve 175 non-conductive, and disconnect the "off" timing resistor 166 from the voltage divider 154, terminating the "off" time period. An additional secondary winding 183 applies an impulse to a "stop" condenser 185 through a rectifier 186.

When the control valves 162 and 163 of the "on" timing circuit 160 are conductive, a positive bias voltage is produced in the "on" timing resistor 151 which overcomes the negative bias produced in the grid circuit of the control valve 142 from the voltage divider 154, and renders the control valve 142 conductive. The discharge device 136 is thus rendered conductive for positive half cycles of the source 13 and the condenser 11 is connected to the source for charging. Discharge of the condenser through the switch means 16 occurs in the manner described in detail in connection with the welding system of Fig. 1 The impulse of current through the impedance 12 in charging the condenser on a positive half cycle produces a control voltage in the grid circuit of the control valve 143 through the grid transformer 152 which renders the discharge device 137 conductive for the succeeding negative half cycle of the source 13 thus charging the condenser 11 in the opposite direction.

The control valve 142 is periodically rendered conductive on successive positive half cycles of the source 13 during an interval determined by by the charging time of the "on" timing condenser 164. When the condenser 164 discharges through the control valve 170 rendering the control valve 162 non-conductive and rendering the control valve 174 of the "off" timing circuit conductive, the control valve 142 of the arc discharge device 136 is rendered non-conductive. The flow of current through the "off" timing resistor 166 and the control valves 174 and 173 of the "off" timing circuit from the voltage divider 154 produces a sufficient negative bias in the grid circuit of the control valve 163 of the "on" timing circuit to maintain it non-conductive. The control valves 174 and 175 of the "off" timing circuit remain conductive until the "off" timing condenser 178 reaches a predetermined voltage whereupon it is discharged through its associated control valve 180 and control impulses are produced in the secondary winding of the control transformer 181 to render the control valve 175 non-conductive terminating the "off" period and to add an increment of charge to the "stop" timing condenser 185. Upon the next succeeding impulse from the secondary winding 167 of the impulse transformer 128, the control valves 162 and 163 of the "on" timing circuit are again rendered conductive for a predetermined interval of time and the arc discharge devices 136 and 137 are accordingly rendered conductive to charge the condenser 11 on succeeding half cycles of the source 13.

The "on" timing and "off" timing circuits continue to conduct alternately until the "stop" time condenser 185 receives a predetermined charge whereupon the "stop" valve 187 is rendered conductive, connecting the "off" timing resistor 166 to the voltage divider 154 and producing a negative bias voltage which renders the "on" timing circuit non-conductive, preventing further welding operations until subsequent opening and closure of the control switch 188 which controls the energization of the control relay 189 which controls the connection of the "on" and "off" timing circuits to the voltage divider 154.

In practicing our invention with a circuit such as shown in Fig. 3, periodic impulses of relatively high frequency current having relatively steep wave fronts may be produced for timed periods which are spaced at predetermined time intervals determined by the relatively low frequency source 13, as shown in Figs. 8 and 9, wherein $m$ denotes the relatively high frequency steep wave front weld current impulses, timed relative to the voltage curve $n$ of the source 13. The timing thereof may be varied relative to the source voltage wave by varying the amplitude of the negative bias voltage $o$ relative to the value of the condenser voltage wave $p$. Accordingly, successive impulses of relatively high frequency current may be applied to the members to be welded at spaced intervals of time, so as to permit cooling of the surfaces therebetween by conductivity of the heat from the surfaces through the electrode members as well as during the "off" intervals.

Not only are the advantages of pulsation welding as thus obtained in all the methods of practicing our invention hereinbefore described, but in addition, the skin effect of the relatively high frequency, or relatively steep wave front current impulses, may be utilized to produce a concentration of the weld current about the periphery of the weld spot in the manner illustrated in Fig. 10. As shown therein, the lines extending between the electrodes indicate typical current paths through the weld members. These paths instead of crowding to the center of the initial point of fusion between the members, crowd about the periphery. Welds are thus produced which are ringlike, having a relatively high strength about the periphery. Such welds are materially stronger and are more able to resist forces tending to separate the members.

From the above description and the accompanying drawings, it will be realized that we have provided an improved method of welding which is simple and effective, and which utilizes not only the principles of pulsation welding wherein timed intervals are provided between repeated impulses of weld current to permit at least partial cooling of the member being welded at the surface thereof, but further utilizes the advantages of relatively high frequency or steep wave front impulses, so that the current distribution in the weld zone is such that a concentration of current occurs about the periphery of the weld. Welds may thus be produced wherein the heating effect is localized at the contact surfaces between the members, so that the depth of the fusion and heating effected zones are considerably less. The high frequency, high current impulses tend to flow through the periphery of the weld increasing the area of fushion and/or increasing the strength of the weld where the stresses are the greatest when the weld is loaded.

Welds which would be impossible by ordinary methods of welding with a given capacity of resistance welding transformer, may be made with circuits such as described. Such welds have been made on members of copper and aluminum by practicing the invention, where it would be otherwise impossible to weld such members in the conventional manner. Discharge frequencies on the order of 1000 cycles a second produce satisfactory welds. Better results may be obtained with higher discharge frequencies or with current impulses having steeper wave fronts which are characteristic of high frequencies, where the skin effect is more pronounced, and the concentration of weld current about the periphery of the weld point tends to produce actual ring welds. Discharge frequencies on the order of 20,000 cycles, whereby the effective resistance of a typical weld spot of approximately ¼ inch diameter may be increased approximately four times, result in substantially "ring" welds, as the concentration of weld current about the periphery of the weld is appreciable, causing a crowding of the current to the periphery and a marked increase in the strength of the peripheral weld zone.

Since certain changes may be made in the above description and different embodiments of the invention may be made without departing from the spirit thereof, it is intended that all the matter contained in the above description or shown in the accompanying drawings shall be considered as illustrative and not in a limiting sense.

We claim as our invention:

1. The method of resistance welding electrically conductive parts which comprises forming weld spots by subjecting each spot to successive pulses of welding current at timed intervals, each of said pulses being of greater than one-half cycle of a 60 cycle source and comprising a plurality of discrete high frequency impulses, each of said impulses having a duration of less than one half cycle of a 60 cycle source with each of said impulses occurring in successive half cycle of a 60-cycle source and consisting of at least one complete cycle of the high frequency.

2. A method of interrupted resistance welding metal parts which comprises, producing ring-shaped welds therebetween by subjecting the parts at each weld zone to successive timed pulses of current at predetermined timed intervals, each pulse being of greater duration than one-half cycle of a 60 cycle source and consisting of a plurality of discrete impulses of relatively high frequency each having a duration less than one half cycle of a relatively low frequency wave with each of said impulses occurring in successive half cycles of said wave so as to be spaced less than at one half cycle intervals of said low frequency and consisting of at least one cycle of the high frequency.

ALFRED B. WHITE.
CHARLES H. JENNINGS.